US012686760B2

(12) United States Patent
Lin et al.

(10) Patent No.: US 12,686,760 B2
(45) Date of Patent: Jul. 21, 2026

(54) ULTRASONIC TRANSDUCER MATCHING LAYER MATERIAL AND PREPARATION METHOD THEREOF

(71) Applicant: Shantou Institute of Ultrasonic Instruments Co., Ltd., Shantou (CN)

(72) Inventors: Jinhao Lin, Shantou (CN); Yanxiong Yu, Shantou (CN); Jiacai Lin, Shantou (CN); Jianwei Cai, Shantou (CN); Zewen Lin, Shantou (CN)

(73) Assignee: Shantou Institute of Ultrasonic Instruments Co., Ltd., Shantou (CN)

( * ) Notice: Subject to any disclaimer, the term of this patent is extended or adjusted under 35 U.S.C. 154(b) by 27 days.

(21) Appl. No.: 18/769,726

(22) Filed: Jul. 11, 2024

(65) Prior Publication Data

US 2025/0019523 A1 Jan. 16, 2025

(30) Foreign Application Priority Data

Jul. 14, 2023 (CN) .......................... 202310861620.3

(51) Int. Cl.
*C08K 13/04* (2006.01)
*B29B 7/22* (2006.01)
(Continued)

(52) U.S. Cl.
CPC .............. *C08K 13/04* (2013.01); *C08J 3/203* (2013.01); *B29B 7/22* (2013.01); *B29C 35/02* (2013.01); *B29C 37/006* (2013.01); *B29K 2021/003* (2013.01); *B29K 2105/16* (2013.01); *B29K 2505/02* (2013.01); *B29K 2507/04* (2013.01); *B29K 2995/0002* (2013.01); *B29K*

*2995/0013* (2013.01); *B29K 2995/0063* (2013.01); *B29K 2995/0094* (2013.01); *B29K 2995/0097* (2013.01); *C08J 2361/06* (2013.01); *C08K 3/04* (2013.01); *C08K 2003/2227* (2013.01);
(Continued)

(58) Field of Classification Search
CPC .......... C08K 13/04; C08K 3/04; C08K 5/098; C08K 7/06; C08K 2003/2227; C08K 2201/014; C08K 7/08; C08J 3/203; C08J 2361/06; B29B 7/22; B29C 35/02; B29C 37/006; B29K 2021/003; B29K 2105/16; B29K 2505/02; B29K 2507/04; B29K 2995/0002; B29K 2995/0013; B29K 2995/0063; B29K 2995/0094; B29K 2995/0097
See application file for complete search history.

(56) References Cited

U.S. PATENT DOCUMENTS 4,756,808 A * 7/1988 Utsumi ................... B06B 1/067
427/124
2021/0388179 A1* 12/2021 Tomita ..................... C08K 7/28
(Continued)

*Primary Examiner* — S. Behrooz Ghorishi
(74) *Attorney, Agent, or Firm* — Westbridge IP LLC

(57) ABSTRACT

Disclosed are an ultrasonic transducer matching layer material and a preparation method thereof. The ultrasonic transducer matching layer material includes the following components in parts by weight: 15~34 parts of phenolic resin, 50~92 parts of alumina, 3~17 parts of graphite, 1~16 parts of carbon fiber, 1.5~5 parts of curing agent and 0.5~5 parts of lubricant. The ultrasonic transducer matching layer material is prepared by internal mixing and thermoforming the powder of raw materials.

5 Claims, 2 Drawing Sheets

(51) Int. Cl.

| | |
|---|---|
| *B29C 35/02* | (2006.01) |
| *B29C 37/00* | (2006.01) |
| *B29K 21/00* | (2006.01) |
| *B29K 105/16* | (2006.01) |
| *B29K 505/02* | (2006.01) |
| *B29K 507/04* | (2006.01) |
| *C08J 3/20* | (2006.01) |
| *C08K 3/04* | (2006.01) |
| *C08K 3/22* | (2006.01) |
| *C08K 5/098* | (2006.01) |
| *C08K 7/06* | (2006.01) |

(52) U.S. Cl.
CPC ................ *C08K 5/098* (2013.01); *C08K 7/06* (2013.01); *C08K 2201/014* (2013.01)

(56) References Cited

U.S. PATENT DOCUMENTS

| | | | |
|---|---|---|---|
| 2022/0144981 A1 * | 5/2022 | Hamada | B01J 2/12 |
| 2024/0285177 A1 * | 8/2024 | Rajagopal | A61B 5/746 |
| 2025/0320337 A1 * | 10/2025 | MacDowell | C08L 51/08 |

* cited by examiner

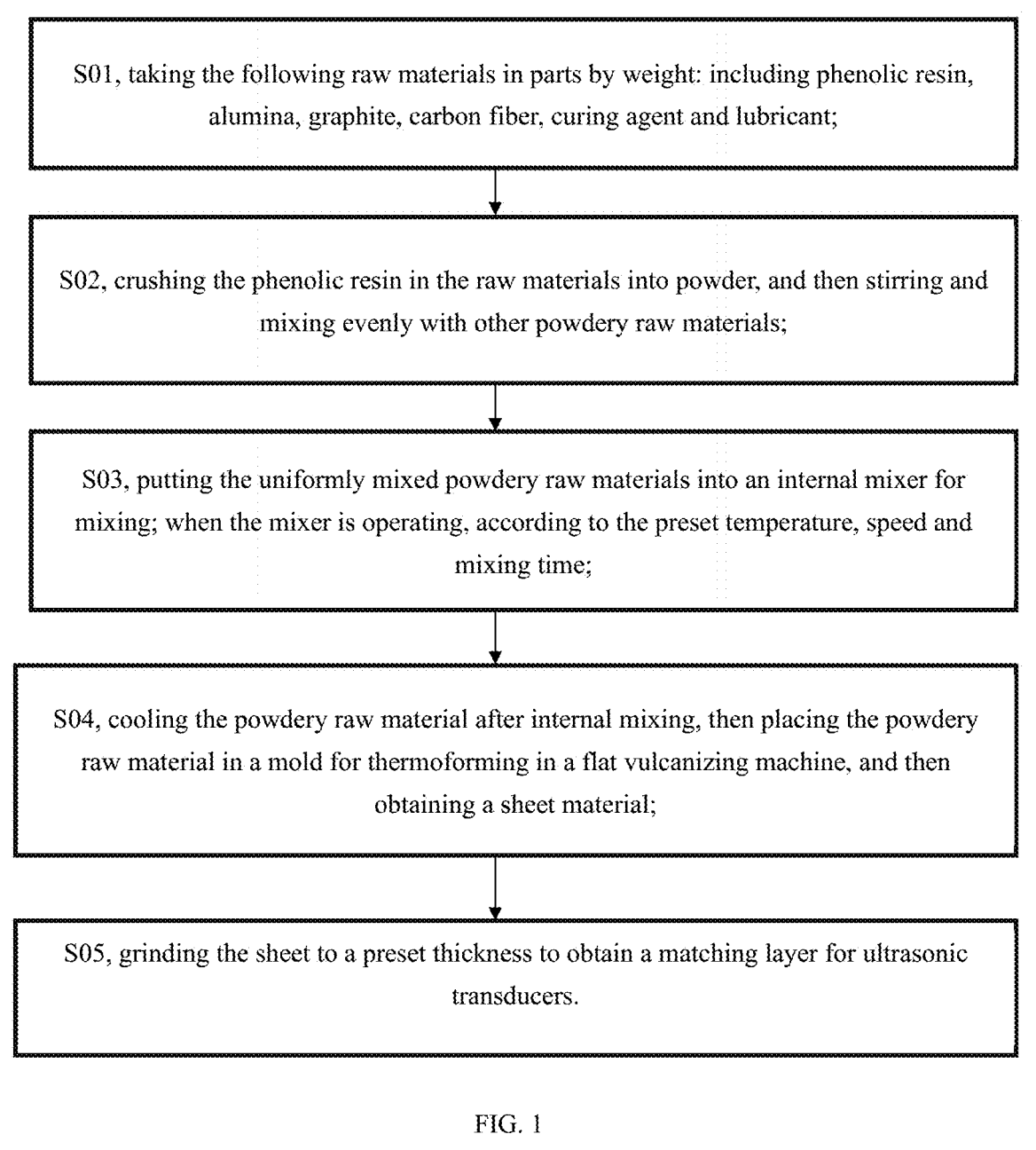

S01, taking the following raw materials in parts by weight: including phenolic resin, alumina, graphite, carbon fiber, curing agent and lubricant;

S02, crushing the phenolic resin in the raw materials into powder, and then stirring and mixing evenly with other powdery raw materials;

S03, putting the uniformly mixed powdery raw materials into an internal mixer for mixing; when the mixer is operating, according to the preset temperature, speed and mixing time;

S04, cooling the powdery raw material after internal mixing, then placing the powdery raw material in a mold for thermoforming in a flat vulcanizing machine, and then obtaining a sheet material;

S05, grinding the sheet to a preset thickness to obtain a matching layer for ultrasonic transducers.

FIG. 1

ULTRASONIC TRANSDUCER MATCHING LAYER MATERIAL AND PREPARATION METHOD THEREOF

CROSS-REFERENCE TO RELATED APPLICATIONS

The present application priority to Chinese Patent Application No. 202310861620.3, filed on Jul. 14, 2023. All of the aforementioned applications are incorporated herein by reference in their entireties.

TECHNICAL FIELD

The application relates to the technical field of ultrasonic transducer materials, in particular to an ultrasonic transducer matching layer material and a preparation method thereof.

BACKGROUND

When using an ultrasonic transducer, the acoustic impedance of human soft tissue is about $1.5 \times 106$ Pa·s/m, while the acoustic impedance of piezoelectric ceramic transducer (PZT) could be as high as $38 \times 106$ Pa·s/m, between which there is a big difference. If the PZT contacts the human body directly, ultrasound is radiated into the human soft tissue by the PZT. Due to the big difference between the PZT and the human body, the reflection coefficient is large and the transmission coefficient is small. Therefore most of the ultrasound waves are reflected, and only a small portion of the ultrasound wave is transmitted, resulting in the failure to acquire ultrasound echoes properly and affecting the final imaging.

To overcome this shortcoming, some medium layers are inserted between the PZT and the human body, that is, matching layers, so that the acoustic impedance between the PZT and the human body changes gradually and the imaging effect optimized. Therefore, the quality of matching layers greatly affects the overall performance of ultrasonic transducers. At present, most matching layers in ultrasonic transducers are single-layer, double-layer or triple-layer, and only a few matching layers have over three layers. The matching layer connected with the PZT is the first layer. The first matching layer connected with the PZT shall have high acoustic impedance due to the high PZT acoustic impedance, and the material for preparing the matching layer shall also have high acoustic impedance. The commonly used first matching layer is made of epoxy resin+tungsten powder. The tungsten powder is evenly distributed in the epoxy resin to obtain a material with high acoustic impedance. The first matching layer made of such material has high acoustic impedance.

However, the high cost of tungsten powder might lead to the high overall cost of matching layers. Moreover, the matching layers made of epoxy resin+tungsten powder has the problem of high attenuation rate. For high frequency sound waves with poor penetration, it will lead to excessive attenuation of sound waves that lowers the sensitivity of ultrasonic transducers and affects imaging. In addition, tungsten powder, due to its high density, tends to sink in epoxy resin, causing uneven dispersion and serious warpage after molding, and high defect rate.

Due to the uneven dispersion of tungsten powder in epoxy resin, even if the thermal conductivity of tungsten powder is as high as 173 W/m*K, it is not easy to form a thermal conduction path in this mechanism. The actual measured thermal conductivity is only about 2.6 W/m*K, which proves that it does not form a thermal conduction path appropriately. The bad thermal conductivity of the matching layers might cause the probe to accumulate a lot of waste heat after working for a long time, thus damaging the components and shortening the service life of the probe.

SUMMARY

The present application aims at providing an ultrasonic transducer matching layer material and a preparation method thereof, specifically to provide an ultrasonic transducer matching layer material and a preparation method thereof with low material cost, high acoustic impedance, good thermal conductivity and stable acoustic performance.

In order to achieve the objective above, the following technical solution is used in the present application: an ultrasonic transducer matching layer material comprising the following components in parts by weight: 15~34 parts of phenolic resin, 50~92 parts of alumina, 3~17 parts of graphite, 1~16 parts of carbon fiber, 1.5~5 parts of curing agent and 0.5~5 parts of lubricant.

Specifically, the phenolic resin is thermoplastic phenolic resin.

Specifically, the curing agent is hexamethylenetetramine.

Specifically, the lubricant is calcium stearate or zinc stearate.

The method for preparing matching layer material of ultrasonic transducers comprises the following steps:

S01, taking the following raw materials in parts by weight: 15~34 parts of phenolic resin, 50~92 parts of alumina, 3~17 parts of graphite, 1~16 parts of carbon fiber, 1.5~5 parts of curing agent and 0.5~5 parts of lubricant;

S02, crushing the phenolic resin in the raw materials into powder, and then stirring and mixing evenly with other powdery raw materials;

S03, putting the uniformly mixed powdery raw materials into an internal mixer for mixing;

S04, cooling the powdery raw material after internal mixing, then placing the powdery raw material in a mold for thermoforming in a flat vulcanizing machine, and then obtaining a sheet material; and S05, grinding the sheet to a preset thickness to obtain a matching layer for ultrasonic transducers.

Specifically, the phenolic resin in step S01 is thermoplastic phenolic resin.

Specifically, the curing agent in step S01 is hexamethylenetetramine.

Specifically, the alumina in step S01 is needle-like alumina powder with a particle size of 3~4 μm.

Specifically, the lubricant in step S01 is calcium stearate or zinc stearate.

Specifically, when using a flat vulcanizing machine for thermoforming in step S04, the flat vulcanizing machine is set to an automatic mode, specifically comprising the following steps:

S41, pre-pressurizing for 6~10 minutes at a pressure of 15~20 MPa;

S42, degassing 5~15 times, 10 seconds for each degassing;

S43, pressurizing for 60~90 minutes at a pressure of 20~25 MPa; and

S44, cooling to 30~50° C.

The application has the beneficial effects that: by using alumina, specifically mixing needle-shaped alumina with phenolic resin to produce a material with a high acoustic impedance and low acoustic attenuation, which reduces the material cost and processing difficulty; combining with graphite as a good thermal conductor, therefore improving the material thermal conductivity; using calcium stearate or zinc stearate as a lubricant to effectively improve the overall molding effect of the matching layer material and improve the product pass rate; Moreover, carbon fiber effectively improves the overall stability of the matching layer material, and improves the acoustic performance and pass rate of products.

BRIEF DESCRIPTION OF THE DRAWINGS

FIG. 1 illustrates the preparation for matching layer material.

DETAILED DESCRIPTION OF THE EMBODIMENTS

Figure 2:
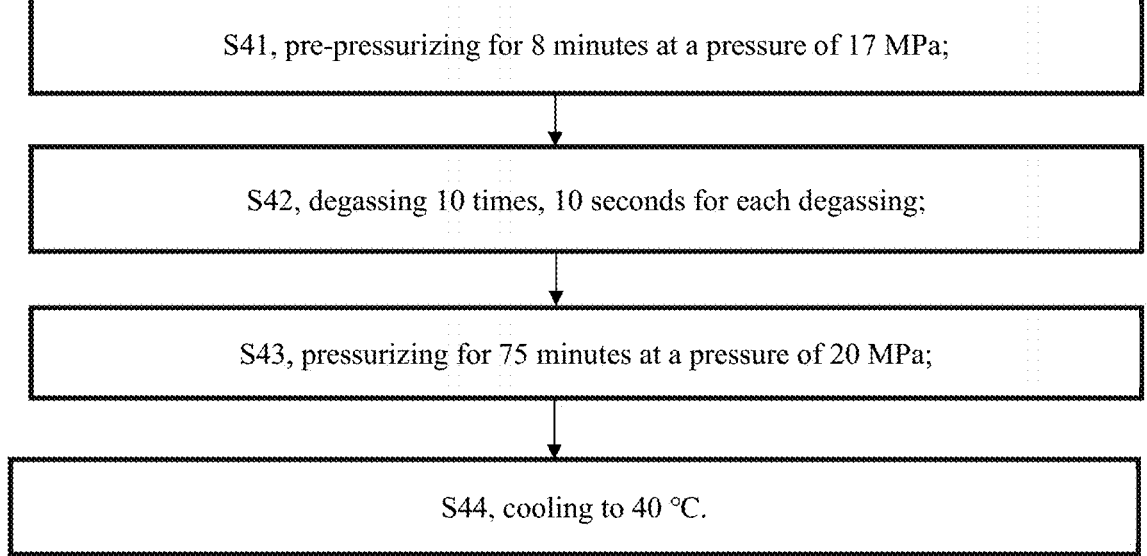
FIG. 2 illustrates the flat vulcanizing machine is set to an automatic mode when using a flat vulcanizing machine for thermoforming.

Embodiment 1, an ultrasonic transducer matching layer material comprises the following components in parts by weight: 20 parts of phenolic resin, 55 parts of alumina, 6 parts of graphite, 10 parts of carbon fiber, 2 parts of curing agent and 0.5 parts of lubricant, wherein the phenolic resin is thermoplastic phenolic resin, the curing agent is hexam-ethylenetetramine, and the lubricant is calcium stearate or zinc stearate.

The embodiment further provides a method for preparing matching layer material of ultrasonic transducers compris-ing the following steps:

S01, taking the following raw materials in parts by weight: 20 parts of phenolic resin, 55 parts of alumina, 6 parts of graphite, 10 parts of carbon fiber, 2 parts of curing agent and 0.5 parts of lubricant;

S02, crushing the phenolic resin in the raw materials into powder, and then stirring and mixing evenly with other powdery raw materials;

S03, putting the uniformly mixed powdery raw materials into an internal mixer for mixing; when the mixer is oper-ating, the temperature of the mixer is set to 110° C., the speed is 30 rpm, and the mixing time is 30 min.

S04, cooling the powdery raw material after internal mixing, then placing the powdery raw material in a mold for thermoforming in a flat vulcanizing machine, and then obtaining a sheet material; and S05, grinding the sheet to a preset thickness to obtain a matching layer for ultrasonic transducers.

Wherein step S01, the phenolic resin is thermoplastic phenolic resin; the curing agent is hexamethylenetetramine; the alumina is needle-like alumina powder with a particle size of 3~4 μm; the lubricant in step S01 is calcium stearate or zinc stearate; the graphite is 1250 mesh micronized graphite, with a particle size of about 10 μm; the carbon fiber has a monofilament diameter of 7 μm and an average length of 50 μm.

Specifically in step S04, when using a flat vulcanizing machine for thermoforming, the flat vulcanizing machine is set to an automatic mode, specifically comprising the fol-lowing steps:

S41, pre-pressurizing for 8 minutes at a pressure of 17 MPa;

S42, degassing 10 times, 10 seconds for each degassing;

S43, pressurizing for 75 minutes at a pressure of 20 MPa; and

S44, cooling to 40° C.

Embodiment 2, an ultrasonic transducer matching layer material comprises the following components in parts by weight: 20 parts of phenolic resin, 75 parts of alumina, 6 parts of graphite, 10 parts of carbon fiber, 2 parts of curing agent and 0.5 parts of lubricant, wherein the phenolic resin is thermoplastic phenolic resin, the curing agent is hexam-ethylenetetramine, and the lubricant is calcium stearate or zinc stearate.

The embodiment further provides a method for preparing matching layer material of ultrasonic transducers compris-ing the following steps:

S01, taking the following raw materials in parts by weight: 20 parts of phenolic resin, 75 parts of alumina, 6 parts of graphite, 10 parts of carbon fiber, 2 parts of curing agent and 0.5 parts of lubricant;

S02, crushing the phenolic resin in the raw materials into powder, and then stirring and mixing evenly with other powdery raw materials;

S03, putting the uniformly mixed powdery raw materials into an internal mixer for mixing; when the mixer is oper-ating, the temperature of the mixer is set to 110° C., the speed is 30 rpm, and the mixing time is 30 min.

S04, cooling the powdery raw material after internal mixing, then placing the powdery raw material in a mold for thermoforming in a flat vulcanizing machine, and then obtaining a sheet material; and S05, grinding the sheet to a preset thickness to obtain a matching layer for ultrasonic transducers.

Wherein step S01, the phenolic resin is thermoplastic phenolic resin; the curing agent is hexamethylenetetramine; the alumina is needle-like alumina powder with a particle size of 3~4 μm; the lubricant in step S01 is calcium stearate or zinc stearate; the graphite is 1250 mesh micronized graphite, with a particle size of about 10 μm; the carbon fiber has a monofilament diameter of 7 μm and an average length of 50 μm.

Specifically in step S04, when using a flat vulcanizing machine for thermoforming, the flat vulcanizing machine is set to an automatic mode, specifically comprising the fol-lowing steps:

S41, pre-pressurizing for 8 minutes at a pressure of 17 MPa;

S42, degassing 10 times, 10 seconds for each degassing;

S43, pressurizing for 75 minutes at a pressure of 20 MPa; and

S44, cooling to 40° C.

Embodiment 3, an ultrasonic transducer matching layer material comprises the following components in parts by weight: 20 parts of phenolic resin, 90 parts of alumina, 6 parts of graphite, 10 parts of carbon fiber, 2 parts of curing agent and 0.5 parts of lubricant, wherein the phenolic resin is thermoplastic phenolic resin, the curing agent is hexam-ethylenetetramine, and the lubricant is calcium stearate or zinc stearate.

The embodiment further provides a method for preparing matching layer materials of ultrasonic transducers compris-ing the following steps:

S01, taking the following raw materials in parts by weight: 20 parts of phenolic resin, 90 parts of alumina, 6 parts of graphite, 10 parts of carbon fiber, 2 parts of curing agent and 0.5 parts of lubricant;

S02, crushing the phenolic resin in the raw materials into powder, and then stirring and mixing evenly with other powdery raw materials;

S03, putting the uniformly mixed powdery raw materials into an internal mixer for mixing; when the mixer is operating, the temperature of the mixer is set to 110° C., the speed is 30 rpm, and the mixing time is 30 min.

S04, cooling the powdery raw material after internal mixing, then placing the powdery raw material in a mold for thermoforming in a flat vulcanizing machine, and then obtaining a sheet material; and S05, grinding the sheet to a preset thickness to obtain a matching layer for ultrasonic transducers.

Wherein step S01, the phenolic resin is thermoplastic phenolic resin; the curing agent is hexamethylenetetramine; the alumina is needle-like alumina powder with a particle size of 3~4 μm; the lubricant in step S01 is calcium stearate or zinc stearate; the graphite is 1250 mesh micronized NOLOGY (NINGBO) CO LTD. with the model of Brofos-W-M500, and the particle size was 500 mesh spherical tungsten powder.

As the raw materials of the control group was lack of the lubricant calcium stearate and could not be molded finally, the matching layer materials prepared from the test groups 1 to 3 and the epoxy resin+tungsten powder were uniformly ground to a thickness of 0.225 mm before testing its acoustic performance. Specifically, the acoustic velocity was tested by the echo method, and the density was tested by the densitometer; the acoustic impedance, acoustic attenuation coefficient and thermal conductivity were tested respectively. The experimental results were obtained as shown in the following table.

| Sample | Test Items | | | | |
| | Velocity mm/μs | Density g/cm$^3$ | Acoustic impedance $\times 10^6$ Pa · s/m | Acoustic attenuation coefficient dB/mm | Thermal conductivity W/m*K | Remarks |
|---|---|---|---|---|---|---|
| Test group 1 | 3.600 | 2.375 | 8.55 | 1.65 | 5.6 | |
| Test group 2 | 3.986 | 2.391 | 9.53 | 1.92 | 6.7 | |
| Test group 3 | 5.859 | 2.478 | 14.52 | 2.14 | 7.9 | |
| Control group 1 | — | — | — | — | — | Molding unavailable |
| Epoxy + tungsten powder | 3442 | 2.647 | 9.12 | 3.54 | 2.6 | | graphite, with a particle size of about 10 μm; the carbon fiber has a monofilament diameter of 7 μm and an average length of 50 μm.

Specifically in step S04, when using a flat vulcanizing machine for thermoforming, the flat vulcanizing machine is set to an automatic mode, specifically comprising the following steps:

S41, pre-pressurizing for 8 minutes at a pressure of 17 MPa;

S42, degassing 10 times, 10 seconds for each degassing;

S43, pressurizing for 75 minutes at a pressure of 20 MPa; and

S44, cooling to 40° C.

Embodiments 1 to 3 are taken as test groups 1 to 3 respectively in the present application, by combining with a control group and the matching layer materials prepared from epoxy resin+tungsten powder, wherein the raw materials used in the control group comprise 33 parts of phenolic resin, 90 parts of alumina, 15 parts of carbon fiber, 9 parts of graphite and 3 parts of hexamethylenetetramine by weight, and are prepared according to the preparation method in Embodiments 1-3. Wherein preparing the matching layer materials of epoxy resin+tungsten powder in the following method: mixing the following raw materials in parts by weight: 100 parts of epoxy resin E51, 140 parts of tungsten powder and 12.5 parts of tetraethylene pentamine; vacuumizing the raw materials to a bubble-free state after mixing, pouring the materials on a glass plate with a filling enclosure frame, and pressing the glass plate by another glass plate; transferring the glass plate containing the raw materials to a fixed support, and placing the glass plate into an oven for curing and molding to obtain the existing matching layer materials prepared by epoxy resin+tungsten powder. Wherein the epoxy resin E51 was produced by Baling Petrochemical with the model of CYD-128, and the type was bisphenol A epoxy resin with low viscosity. The tungsten powder was produced by BROFOS NANOTECH- As shown in the test results, compared with the matching layers prepared by epoxy resin+tungsten powder, the matching layers prepared by using these embodiments have the characteristics of high acoustic impedance, low acoustic attenuation and high thermal conductivity and overall lower material costs.

Certainly the embodiments above are preferred for the present application only, but not intended to restrict the scope of use of the present application. Therefore, any equivalent changes made on the principles of the present application should be included in the protection scope of the present application.

What is claimed is:

1. A method for preparing matching layer materials of ultrasonic transducers, comprising following steps:

S01, taking the following raw materials in parts by weight: 15~34 parts of phenolic resin, 50~92 parts of alumina, 3~17 parts of graphite, 1~16 parts of carbon fiber, 1.5~5 parts of curing agent and 0.5~5 parts of lubricant;

S02, crushing the phenolic resin in the raw materials into powder, and then stirring and mixing evenly with other powdery raw materials;

S03, putting the uniformly mixed powdery raw materials into an internal mixer for mixing;

S04, cooling the powdery raw material after internal mixing, then placing the powdery raw material in a mold for thermoforming in a flat vulcanizing machine, and then obtaining a sheet material; and S05, grinding the sheet to a preset thickness to obtain a matching layer for ultrasonic transducers;

wherein needle-like alumina powder with a particle size of 3~4 μm for the alumina is used in step S01.

2. The method for preparing matching layer material of ultrasonic transducers according to claim 1, wherein the phenolic resin in step S01 is thermoplastic phenolic resin.

3. The method for preparing matching layer material of ultrasonic transducers according to claim 1, wherein the curing agent in step S01 is hexamethylenetetramine.

4. The method for preparing matching layer material of ultrasonic transducers according to claim 1, wherein calcium stearate or zinc stearate is used as the lubricant in step S01.

5. The method for preparing matching layer material of ultrasonic transducers according to claim 1, wherein step S04 comprises following steps:

S41, pre-pressurizing for 6~10 minutes at a pressure of 15~20 MPa;

S42, degassing 5~15 times, 10 seconds for each degassing;

S43, pressurizing for 60~90 minutes at a pressure of 20~25 MPa; and

S44, cooling to 30~50° C.

* * * * *